(12) United States Patent
Marton et al.

(10) Patent No.: US 7,010,119 B2
(45) Date of Patent: Mar. 7, 2006

(54) ECHO CANCELLER WITH REDUCED REQUIREMENT FOR PROCESSING POWER

(75) Inventors: Trygve Frederik Marton, Oslo (NO); Ingvar Flaten Aarnes, Oslo (NO)

(73) Assignee: Tandberg Telecom AS, Lysaker (NO)

( * ) Notice: Subject to any disclaimer, the term of this patent is extended or adjusted under 35 U.S.C. 154(b) by 177 days.

(21) Appl. No.: 10/724,043

(22) Filed: Dec. 1, 2003

(65) Prior Publication Data

US 2004/0218755 A1 Nov. 4, 2004

(30) Foreign Application Priority Data

Mar. 10, 2003 (NO) .................................. 031103

(51) Int. Cl.
*H04B 3/23* (2006.01)
(52) U.S. Cl. .................. 379/406.06; 370/286
(58) Field of Classification Search ...............
379/406.01–406.16
See application file for complete search history.

(56) References Cited

U.S. PATENT DOCUMENTS

| | | | |
|---|---|---|---|
| 4,747,132 A | | 5/1988 | Ibaraki et al. |
| 5,305,309 A | | 4/1994 | Chujo et al. |
| 5,572,545 A | * | 11/1996 | Hachem et al. ........ 379/406.08 |
| 5,732,134 A | | 3/1998 | Sih |
| 6,246,760 B1 | | 6/2001 | Makino et al. |
| 6,865,270 B1 | * | 3/2005 | Troxel ................... 379/406.06 |

2002/0064286 A1  5/2002 Takada et al.

FOREIGN PATENT DOCUMENTS

| | | |
|---|---|---|
| EP | 0 310 055 | 4/1989 |
| EP | 0 443 547 A2 | 8/1991 |
| GB | 2 287 626 A | 9/1995 |
| WO | WO 92/12583 | 7/1992 |

* cited by examiner

*Primary Examiner*—Daniel Swerdlow
(74) *Attorney, Agent, or Firm*—Oblon, Spivak, McClelland, Maier & Neustadt, P.C.

(57) ABSTRACT

An echo canceller processing echo, noise and near end talk in a narrower, but still intelligible, frequency band for reducing required processing power and complexity. In a preferred embodiment of the present invention, an input audio signal of captured sound in an audio communication system is decimated and then divided into a number of sub bands by an analyze filter. Each sub band is processed as in background audio echo cancelling by subtracting the signal with an echo estimate from a model of the acoustic signal in the respective sub band, except from that the signal is also bypassed, adjusted by a filter and subtracted from the processed signal. The resulting signals are then recombined by a synthesize filter and interpolated to the original sampling rate and bandwidth. Finally, the output from the synthesize filter is added to the input audio signal, which has been delayed and adjusted by a filter. The filters are controlled by a control algorithm detecting the presence of near end sound, far end sound and noise, so that the filters, and consequently the high pass filter of the echo canceller, only pass high frequency (above low pass frequencies) when only near end sound is detected.

31 Claims, 5 Drawing Sheets

ECHO CANCELLER WITH REDUCED REQUIREMENT FOR PROCESSING POWER

BACKGROUND OF THE INVENTION

1. Field of the Invention

The present invention relates to an audio communication system and method with improved acoustic characteristics, and particularly to a video conferencing system including an improved audio echo cancellation system.

2. Description of the Related Art

In a background conferencing system set-up that uses loudspeakers, two or more communication units are placed at separate sites. A signal transmitted from one site to another site using a conference system experiences several delays. The delay includes a transmission delay and a processing delay. For a video conferencing system, the processing delay for video signals is considerably larger than the processing delay for the audio signals. Because the video and audio signals have to be presented simultaneously, in phase, a lip sync delay is purposefully introduced to the audio signal, in both the transmitting and receiving signal paths to compensate for the longer video signal delay.

In a background conferencing system, one or more microphones captures a sound wave at a site A, and transforms the sound wave into a first audio signal. The first audio signal is transmitted to a site B, where a television set or an amplifier and loudspeaker, reproduces the original sound wave by converting the first audio signal generated at site A into the sound wave. The produced sound wave at site B, is captured partially by the audio capturing system at site B, converted to a second audio signal, and transmitted back to the system at site A. This problem of having a sound wave captured at one site, transmitted to another site, and then transmitted back to the initial site is referred to as an acoustic echo. In its most severe manifestation, the acoustic echo might cause a feedback sound, when the loop gain exceeds unity. The acoustic echo also causes the participants at both sites A and B to hear themselves, making a conversation over the conferencing system difficult, particularly if there are delays in the system set-up, as is common in video conferencing systems, especially due to the above mentioned lip sync delay. The acoustic echo problem is usually solved using an acoustic echo canceller, described below.

Figure 1:
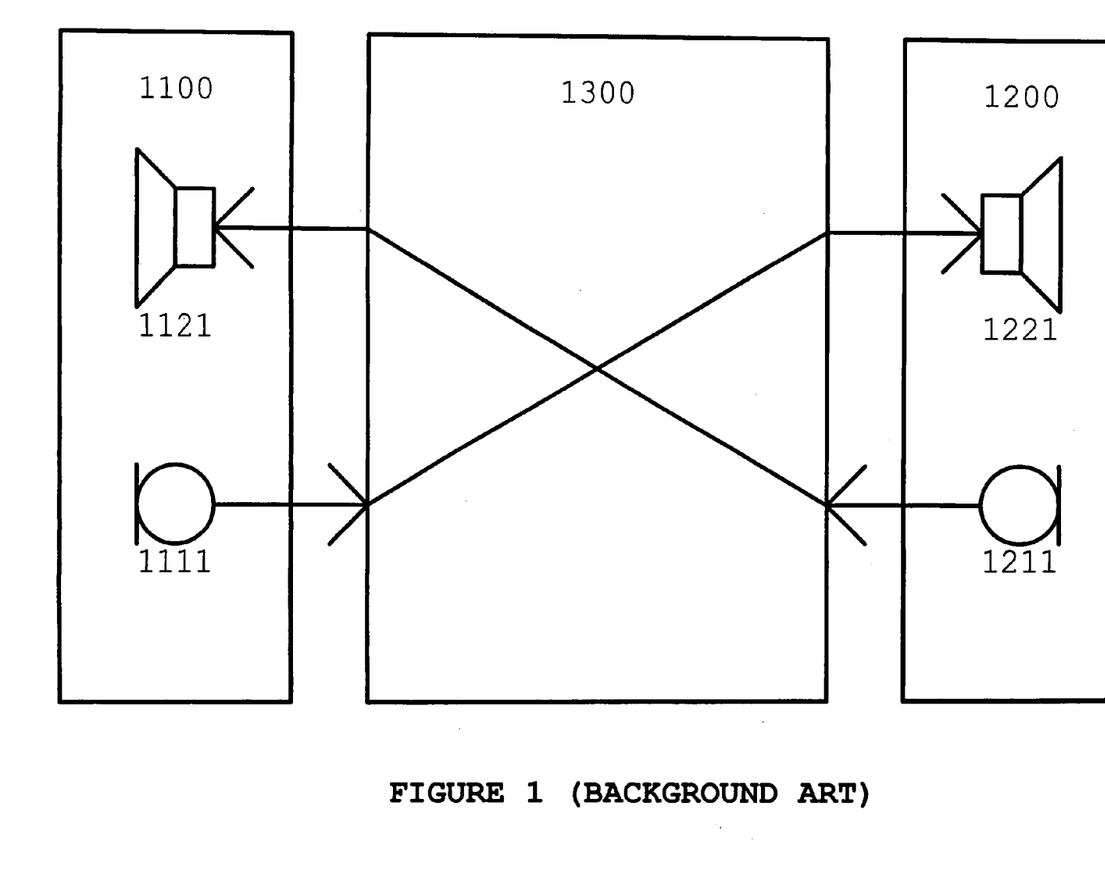
FIG. 1 is an overview block diagram of a background conferencing system set-up.

In more detail, FIG. 1 shows a background conferencing system set-up. For simplicity, FIG. 1 shows the conferencing system set-up distributed at two sites A and B. The two sites are connected through a transmission channel 1300 and each site has a loudspeaker 1100 and 1200, respectively, and a microphone 1111 and 1211, respectively. The arrows in FIG. 1 indicate the direction of propagation for an acoustic signal, usually from the microphone to the loudspeaker.

Figure 2:
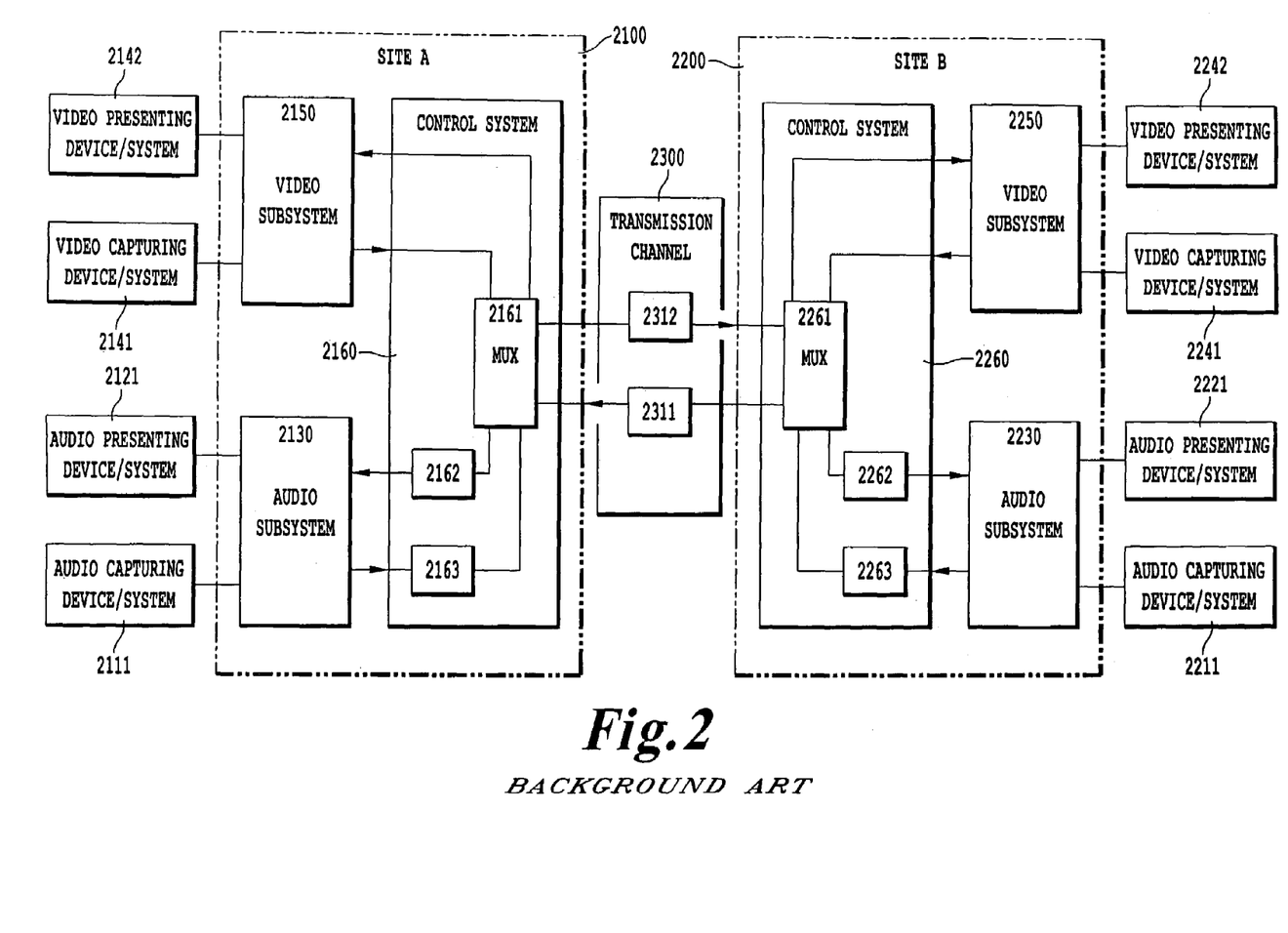
FIG. 2 is a more detailed block diagram of a background conferencing system set-up.

Further, FIG. 2 is an overall view of a video conferencing system. This system is distributed at two sites A and B. As for the conferencing system set-up, a video conferencing module can be distributed at more than two sites and also the system set-up is functional when only one site has a loudspeaker. The video module has at site A a video capturing system 2141 that captures a video image and a video subsystem 2150 that encodes the video image. In parallel, a sound wave is captured by an audio capturing system 2111 and an audio subsystem 2130 encodes the sound wave to the acoustic signal. Due to processing delays in the video encoding system, the control system 2160 introduces additional delays to the audio signal by use of a lip sync delay 2163 so to achieve synchronization between the video and audio signals. The video and audio signals are mixed together in a multiplexer 2161 and the resulting signal, the audio-video signal is sent over the transmission channel 2300 to site B. Additional lip sync delay 2262 is inserted at site B. Further, the audio signal presented by the audio presenting device 2221 is materialized as a sound wave at site B. Part of the sound wave presented at site B arrives to the audio capturing device 2211 either as a direct sound wave or as a reflected sound wave. Capturing the sound at site B and transmitting this sound back to site A together with the associated delays forms the echo. All delays described sum up to be considerable and therefore the quality requirements for an echo canceller in the video conferencing system are particularly high.

Figure 3:
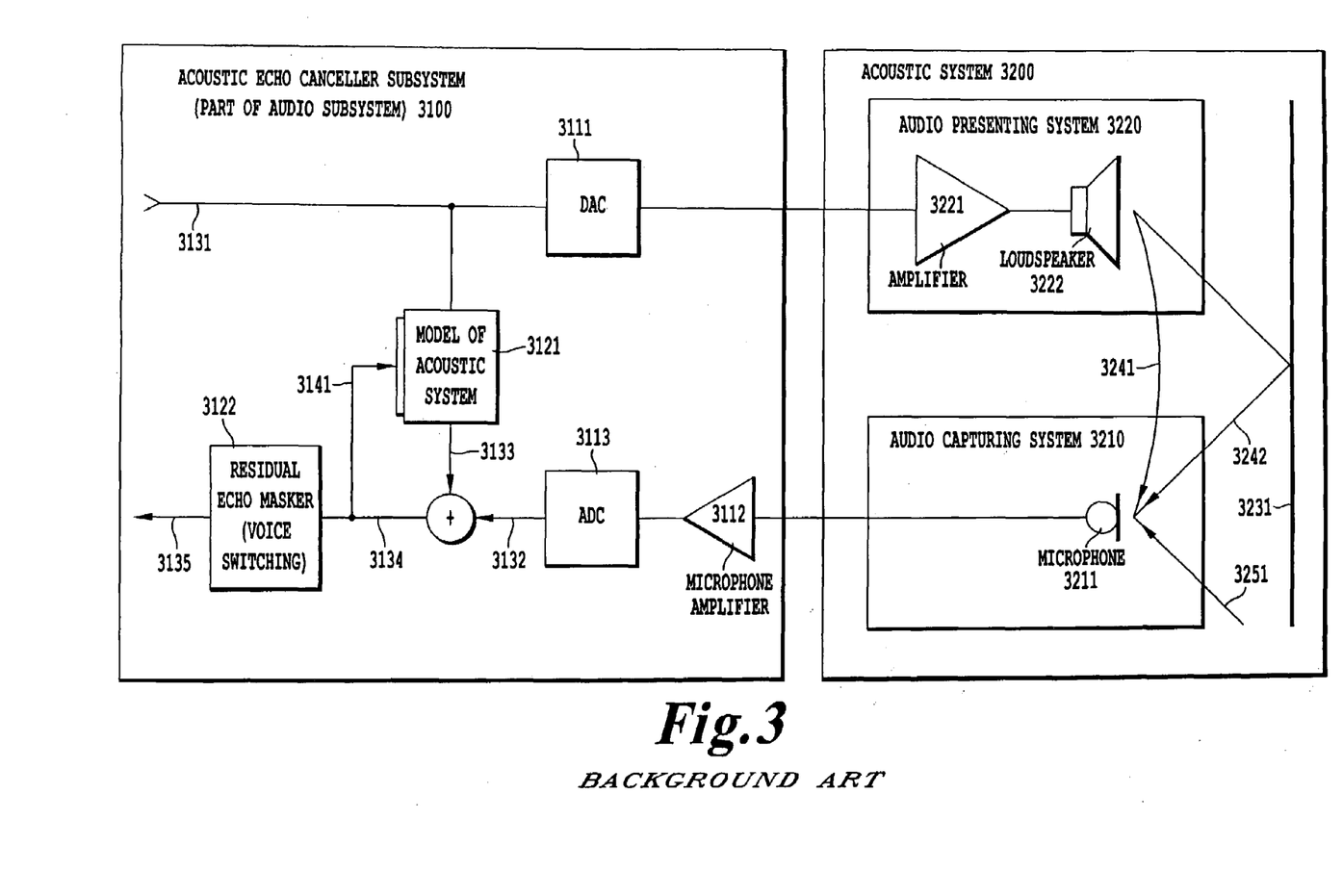
FIG. 3 is a closer view of an acoustic echo canceller subsystem.

Next, FIG. 3 shows an example of an acoustic echo canceller subsystem, which may be a part of the audio system in the video conferencing system of FIG. 2. At least one of the participant sites has the acoustic echo canceller subsystem to reduce the echo in the communication system. The acoustic echo canceller subsystem 3100 is a full band model of a digital acoustic echo canceller. A full band model processes a complete audio band (e.g., up to 20 kHz; for video conferencing the band is typically up to 7 kHz, in audio conferencing the band is up to 3.4 kHz) of the audio signals directly.

As already mentioned, compensation of acoustic echo is normally achieved by an acoustic echo canceller. The acoustic echo canceller is a stand-alone device or an integrated part in the case of the communication system.

The acoustic echo canceller transforms the acoustic signal transmitted from site A to site B, for example, using a linear/non-linear mathematical model and then subtracts the mathematically modulated acoustic signal from the acoustic signal transmitted from site B to site A. In more detail, referring for example to the acoustic echo canceller subsystem 3100 at site B, the acoustic echo canceller passes the first acoustic signal 3131 from site A through the mathematical modeller of the acoustic system 3121, calculates an estimate 3133 of the echo signal, subtracts the estimated echo signal from the second audio signal 3132 captured at site B, and transmits back the second audio signal 3135, less the estimated echo to site A. The echo canceller subsystem of FIG. 3 also includes an estimation error, i.e., a difference between the estimated echo and the actual echo, to update or adapt the mathematical model to a background noise and changes of the environment, at a position where the sound is captured by the audio capturing device.

The model of the acoustic system 3121 used in most echo cancellers is a FIR (Finite Impulse Response) filter, approximating the transfer function of the direct sound and most of the reflections in the room. The FIR filter will preferably not, mainly due to processing power, provide echo cancellation in an infinite time after the signal was captured by the loudspeaker. Instead, it will accept that the echo after a given time, the so-called tail length, will not be cancelled, but will appear as a residual echo.

To estimate the echo in the complete tail length, the FIR filter will need a length L=Fs*tail length, where Fs is the sampling frequency in Hz, and where the tail length is given in seconds.

The required number of each of the multiplications and additions to calculate one single sample output of the filter equals the filter length, and the output of the filter should be calculated once per sample. That is, the total number of multiplications and additions are Fs*L=Fs*Fs*tail length=tail length*Fs$^2$.

A typical value for a tail length is 0.25 sec. The number of multiplications and additions for Fs=8 kHz system will be 16 Million, for 16 kHz 64 Million and for 48 kHz 576 Million.

Similar calculations could be performed for the filter update algorithm. The simplest algorithm, LMS (Least Mean Square), has a complexity proportional to the filter length, which implies a processing power requirement proportional to $Fs^2$, while more complex algorithms have processing power proportional to the square of the filter length, which implies a processing power requirement proportional to $Fs^3$.

Figure 4:
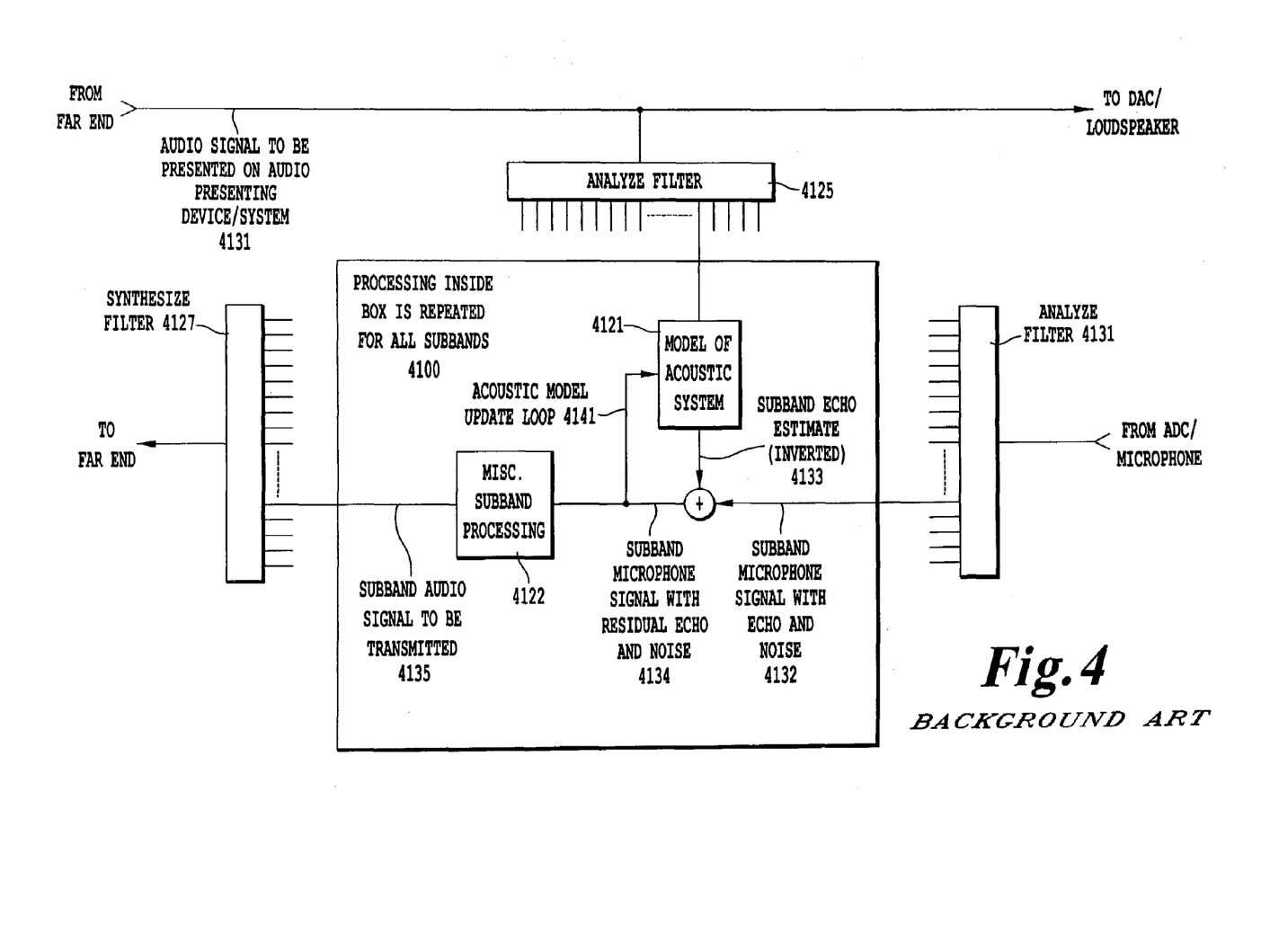
FIG. 4 is a block diagram of the corresponding echo canceller subsystem implemented with sub-band processing.

One way of reducing the processing power requirements of an echo canceller is to introduce sub-band processing, i.e., the signal is divided into bands with a smaller bandwidth, which can be represented using a lower sampling frequency. An example of such system is illustrated in FIG. 4.

Analyze filters 4125, 4131 divide the full band signals from far end and near end, respectively, in N sub-bands. The echo cancellation and miscellaneous sub-band processing (typically, but not limited to non-linear processing and noise reduction) is performed in each sub-band, and thereafter a synthesize filter 5127 recreates the modified full band signals. Note that in the following complexity calculations, many minor processing blocks are omitted, as their contribution to the overall processing power requirements are small.

The analyze filters 4125, 4131 include a filter bank and a decimator, while the synthesize filter 5127 includes a filter bank and an interpolator. The full band signals have sampling frequency $Fs_{fullband}$. The sub-band signals will have a sampling frequency of $Fs_{sub-band} = K/N * Fs_{fullband}$. K is an over sampling factor, introduced to simplify and reduce the processing power requirements of the filter bank. K is always larger than one, but most often relatively small, typically less than two.

The processing power for the filtering and adaptation (assuming FIR and LMS) for the sub-band case is:

$$O^{sub-band} = c_1 * \text{taillength} * Fs_{sub-band}^2 = c_1 * \text{taillength} * (K/N * Fs_{fullband})^2 \text{ ($c_1$ is a proportionally constant)}.$$

Thus, for a high N, the processing power requirements of the filtering can be reduced. However, for the total processing power, the overhead of the analyze and synthesize filters must be added.

Effective methods of analyzing and synthesizing the signals are based on a transform, for example a FFT. The methods have complexity $O_{overhead} = c_2 * N * \log_2 N$, where N is the number of subbands, and c2 is a proportionally constant. The number of subbands will be proportional with $Fs_{fullband}$, and thus $O_{overhead} = c_3 * Fs_{fullband} * \log_2 Fs_{fullband}$.

That is, the total complexity is:

$$O = O_{subband} + O_{overhead} = c_1 * \text{taillength} * (K/N * Fs_{fullband})^2 + c_3 Fs_{fullband} * \log_2 Fs_{fullband}.$$

The echo filtering/adaption is proportional to $Fs_{fullband}^2$. It is possible to reduce the filtering/adaption part by increasing the number of subbands, but at the expense of increased overhead for the calculations of the subband signals. Still, by using a large number of subbands, i.e. using a large fast transform, it is possible to obtain a complexity which increases with $Fs_{fullband} * \log_2 Fs_{fullband}$.

Though theoretically possible, this may be difficult to achieve in practical implementations, due to cache inefficiency in signal processing when applying large transforms.

Thus, efforts have been made for providing a system allowing reduction in the number of sub-bands without increasing the sub-bandwidths.

SUMMARY OF THE INVENTION

Accordingly, an object of the present invention to provide a system allowing a reduction in the number of sub-bands without increasing the sub-bandwidths.

To achieve this and other objects, the present invention provides a novel audio echo canceller including a first decimeter configured to decimate an echo added input signal to produce an input sub-signal, a model of an acoustic echo configured to produce an echo estimate, a first subtractor configured to subtract the echo estimate from the input sub-signal, and a first filter configured to filter the input sub-signal. Also included is a second subtractor configured to subtract the input sub-signal from a signal output by the first subtractor so as to provide an output sub-signal, a second filter configured to filter the echo added input signal, an interpolator configured to interpolate the output sub-signal output from the second subtractor so as to generate an interpolator output signal, and an adding device configured to add the echo added input signal to a signal output by the interpolator output signal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Referring now to the drawings, wherein like reference numerals designate identical or corresponding parts throughout the several views, the present invention will be described.

In the following description, the present invention will be discussed by describing a preferred embodiment, and by referring to the accompanying drawings. However, even if the specific embodiment is described in connection with video conferencing, people skilled in the art will realize other applications and modifications within the scope of the invention as defined in the enclosed independent claim.

The present invention realizes that not all frequencies are equally important in a high frequency echo cancelling system. In more detail, frequencies above approximate 7 kHz do not significantly contribute to speech intelligibility. However, these frequencies impact on the naturalness and experienced vicinity are considerable.

Experience has shown that both speech intelligibility and listening impression are maintained even when the returning signal at certain occurrences is low pass filtered and down sampled. In other words, an audio echo cancellation system may advantageously be designed having:

a) full duplex communication (including echo cancelling) in frequencies which contribute to speech intelligibility, to ensure that no information is lost during double talk, and b) full bandwidth and increased naturalness during periods with single talk.

By properly embodying the above features, the exhaustive sampling frequency influence on the processing power requirements may be reduced, while still obtaining the benefits of full audible bandwidth sound.

The present invention provides a system where echo cancellation and noise reduction is treated as in the background art in communication critical frequency bands, while above this limit, voice switching is preferably used to provide high fidelity speech, and at the same time avoiding echo and feedback.

Figure 5:
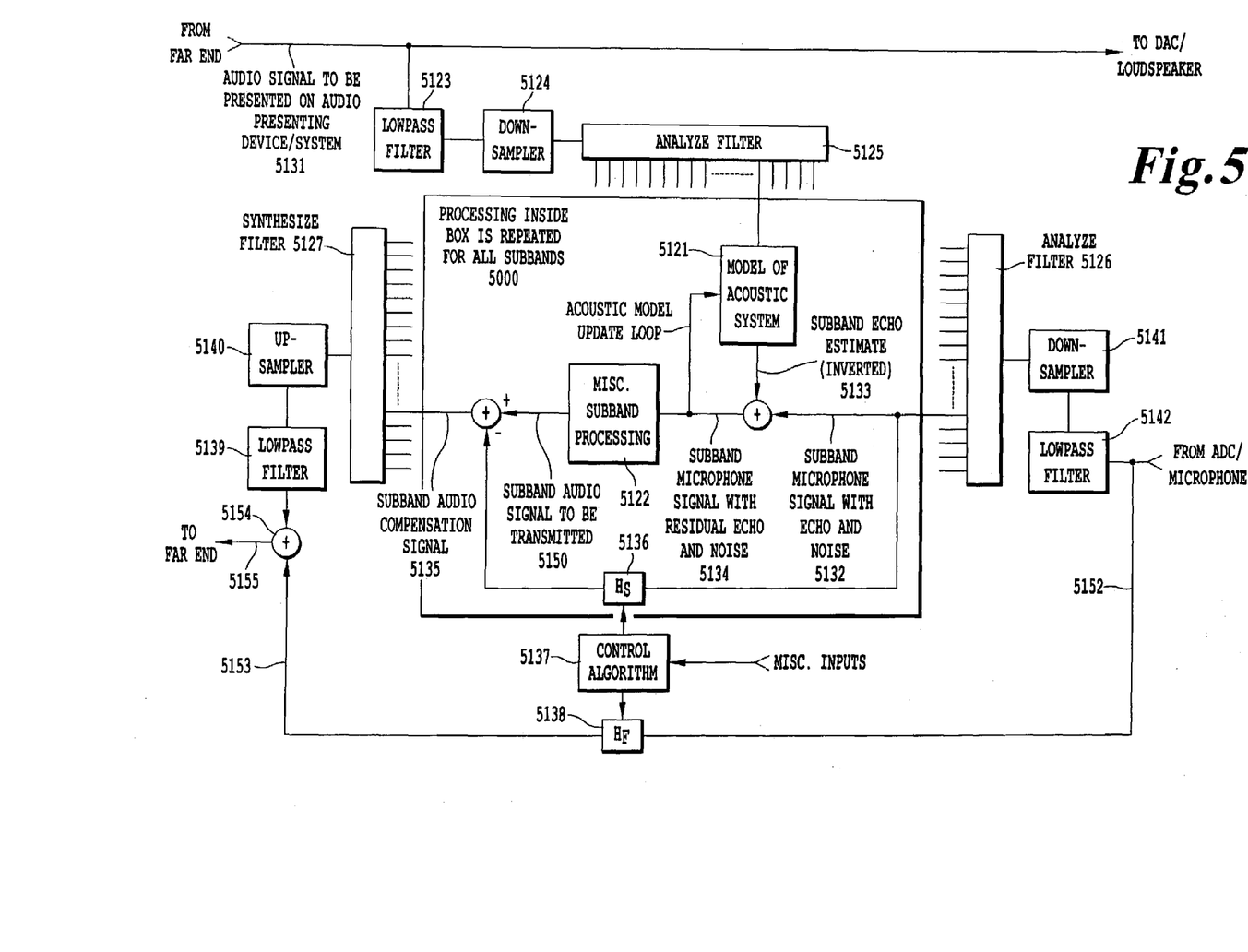
FIG. 5 is a block diagram of an echo canceller subsystem implemented with sub-band processing according to the present invention.

Turning now to FIG. 5, which shows a preferred embodiment of the present invention, and which is based upon the sub-band echo cancellation system of FIG. 4. The overall system of the preferred embodiment operates at sample rate $Fs_{high}$, and the echo canceller working on sample rate $Fs_{low}$, processing sound with frequencies below $Fs_{low}/2$. Note that the processing box 5000 is repeated for all sub-bands.

Before being processed by the echo canceller the signal from site B, including echo, near end sound and/or noise is decimated, i.e., lowpass-filtered and down-sampled by a factor n. The signal is also tapped and forwarded for further processing, and constitutes the part of the output signal with high frequencies (above $Fs_{low}/2$). The lowpass-filtered and down-sampled signal is divided into N sub-bands by the analyze filter. Since the signal that is to be divided in the preferred embodiment of the present invention is lowpass filtered, the required magnitude of N will be reduced correspondingly.

The sub-band signal 5132 is then added to an inverted sub-band echo estimate 5133 generated by a (sub-)model 5121 of the acoustic system. As in the background art, the model preferably includes a FIR filter and an associated filter update algorithm, e.g., a LMS algorithm, having the corresponding sub-band signal of the audio signal from site A and a feedback loop from the result of the above-mentioned addition 5134 as inputs. The resulting signal 5134 is preferably further processed by miscellaneous processing, e.g., residual echo masking (due to the finite nature of the FIR filter, and any other model infirmities), noise reduction and comfort noise addition. The resulting signal after the miscellaneous processing will include the noise reduced and echo free sub-band signal from site B in addition to comfort noise.

The above-mentioned tapped signal is preferably high pass filtered as it intends to contribute to the high frequency part of the output signal. According to the present invention, this is achieved simply by subtracting the low pass filtered signal from the original signal. The lowpass-filtered signal could be provided by tapping it right after the lowpass filter in the decimator (delaying the mic signal by the proper amount of samples T), but this is not preferable as it would make the decimator processing less efficient by prohibiting the integration of lowpass filtering and down sampling. The preferred way is to subtract the clean sub-band signal tapped right after the analyze filter from the processed sub-band signal right before the synthesize filter. This will make a path in the sub-band processing part merely provide the low frequencies of the site B signal, which could be used for highpass filtering the by-passing signal by the already mentioned subtraction.

The lowpass filters 5142, 5139, the downsampler 5141 and the upsampler 5140 governs the highpass filter's profile, together with $H_s$ 5136 and $H_f$ 5138, which are further explained below. Having an appropriate delay of the bypassing signal is of course crucial for this type of filtering, this delay must be added both before and after the filtering by $H_f$, as $H_f$'s magnitude must correspond to $H_s$. These delays should represent the delays in the lowpass-filters, analysis-filters and synthesis-filters, as well as any additional delays.

The present invention provides echo cancelling and noise reduction at low frequencies, and unaltered microphone sound at high frequencies. This is desirable for near end talk, i.e., speech at site B, with a minimum of noise. However, without any level adjustments it might produce feedback, and high frequency echoes will pass right through. Feedback may even damage hearing. Hence, it is preferable to identify situations where full audible bandwidth sound is required, and situations where high frequencies should be attenuated, respectively. According to the preferred embodiment of the present invention, the control algorithm 5137 identifies these situations, typically based on (but not limited to) fullband loudspeaker and microphone signal, subband signals of the same, subband echo estimate and echo cancelled subband signal.

The control algorithm 5137 preferably provides information determining the following situations: a) near end talk, or b) either far end talk, double talk or background noise only. In the case b), the high frequency part of the sound should then be attenuated by adjusting the gain values of $H_s$ and $H_f$ closely to zero. Far end talk will produce echo, and only noise will contain high frequency components, and might trigger feedback. Double talk situations can be handled without high frequency sound because the ear is less sensitive to high fidelity in sound reproduction while the soundscape is chaotic as for instance when people talk at the same time.

The decision making control algorithm constantly produces values, e.g., 1 for situation a) and 0 for b), which is interpreted and used as a basis for the level of high frequency sound, or more precisely, the filters $H_s$ and $H_f$ adjusting the high-pass filter's profile. This is the most important function of the filters $H_s$ and $H_f$, namely the adjustment of the magnitude of the high frequencies. In the following description, an example of a highband gain change interpretation of the decision (i.e., transition from a) to b) or vice versa), is disclosed.

Assume the sound is partitioned in packages of duration 10 ms, at a sample rate of $Fs_{high}$=48000 kS/s, and n=3 so that $Fs_{low}$=16000 kS/s. When the echo canceller operates on sub-bands, the decision is typically taken once a packet, so the adjustment of the filters can be done at most once each sound-packet. As the sub-band samples are representing 10 ms each in a narrow frequency band, while the signal samples from site B on the other hand each represents a small amount of time in a relatively broad frequency band, it would be obvious for one skilled in the art that the result of gain adjustments in the lower frequencies (provided by the magnitude of $H_s$) should accordingly be treated at high frequencies (i.e., the corresponding magnitude of $H_f$).

If the decimator, analyze filter, synthesize filter and interpolator together form a linear phase system, $H_s$ can be reduced to a time invariant gain $G_s$ while $H_f$ can be replaced by appropriate delays and a time invariant gain $G_f$. Any change in $G_s$ must be reflected by a timely distributed changing $G_f$. Only small errors are introduced by calculating $G_f$ as a linear interpolation of consecutive $G_s$ values.

In stable situations, i.e., silence (only noise) or far end talk, the gain of the filters $H_s$ and $H_f$ should stabilize at zero (no high frequency sound/noise). Near end talk will not be a very stable situation, as speech includes both sound (phrases) and silence (between phrases). Still, during phrases it is preferable to let the gain of $H_s$ and $H_f$ (the maximum high frequency gain) be as constant as possible and equal 1, to thereby produce full audible bandwidth sound.

Note that there might be cases of large amounts of background noise where a lower level of maximum high frequency gain (between 0 and 1) is preferable. The reduction of maximum high frequency gain will of course deteriorate the functionality of the device and is preferably solved by reducing high frequency background noise when possible.

Even though the present invention is described in connection with video conferencing, the present invention is also applicable to other equivalent applications like telephone conferences and calls, mobile telephone conferences and calls, web conferences etc.

An advantage of the present invention is that it requires lower processing power than the background art because of fewer sub-bands. Its complexity is $O=c_4*Fs_{low}*\log_2 Fs_{low}+c_5*Fs_{high}$. That is, when the bandwidth increases above the communication critical frequency bands, the complexity only scales linearly with the bandwidth.

Further, the system of the present invention may be added as a framework around existing echo cancellers, with none or only minor adjustments in the existing canceller. Thus, the present invention provides an efficient (in terms of development resources) way of increasing the bandwidth of existing echo canceller systems. It can also be used with both sub-band and full-band echo cancellers.

In addition, an improved audio quality for the near end signal during single talk may be provided. The near end signal transmitted to the far end site has not been passed through the analyze/synthesize (in the sub-band case) filter process, as the magnitude of $H_f$ is 1. Therefore, any distortion or other quality degradations in this process are not added to the near end signal.

Obviously, numerous modifications and variations of the present invention are possible in light of the above teachings. It is therefore to be understood that within the scope of the appended claims, the invention may be practiced otherwise than as specifically described herein.

What is claimed is:

1. An audio echo canceller, comprising:
   a first decimeter configured to decimator an echo added input signal to produce an input sub-signal;
   a model of an acoustic echo configured to produce an echo estimate;
   a first subtractor configured to subtract the echo estimate from the input sub-signal;
   a first filter configured to filter the input sub-signal;
   a second subtractor configured to subtract the filtered input sub-signal from a signal output by the first subtractor so as to provide an output sub-signal;
   a second filter configured to filter the echo added input signal;
   an interpolator configured to interpolate the output sub-signal output from the second subtractor so as to generate an interpolator output signal; and
   an adding device configured to add the filtered echo added input signal to the interpolator output signal.

2. The audio echo canceller according to claim 1, further comprising:
   a first analyze filter configured to divide an output of said first decimator into a number of input sub-signals of respective sub frequency bands; and
   a synthesize filter configured to combine a number of output sub-signals to an input of said interpolator.

3. The audio echo canceller according to claim 2, further comprising:
   a second analyze filter configured to divide an output of a second decimator into said number of input signals of respective sub frequency bands, one of which is an input to said model of the acoustic echo.

4. The audio echo canceller according to claim 3, further comprising:
   a control module configured to adjust a response of said first and second analyze filters based on the input sub-signal and a corresponding echo model input signal.

5. The audio echo canceller according to claim 4, wherein the canceller is a part of a video conferencing system in which an input of the second decimator is a second audio signal captured by a microphone at a far end site including far end sound, and the echo added input signal is a first audio signal captured by a microphone at a near end site including at least one of near end sound, noise and the acoustic echo.

6. The audio echo canceller according to claim 5, wherein the control module detects at least one of a presence and a content of said first and second audio signal and to accordingly adjust said response.

7. The audio echo canceller according to claim 6, wherein the control module adjusts the response to a first positive non-zero value, less than or equal to one, if near end sound together with noise, or near end sound only is detected, and to a second zero value in all other cases.

8. The audio echo canceller according to claim 4, wherein the canceller is a part of one of a telephone communication and a conferencing system in which an input of the second decimator is a second audio signal captured by a microphone at a far end site including far end sound, and the echo added input signal is a first audio signal captured by a microphone at a near end site including at least one of near end sound, noise and the acoustic echo.

9. The audio echo canceller according to claim 8, wherein the control module detects at least one of a presence and a content of said first and second audio signal and to accordingly adjust said response.

10. The audio echo canceller according to claim 9, wherein the control module adjusts the response to a first positive non-zero value, less than or equal to one, if near end sound together with noise, or near end sound only is detected, and to a second zero value in all other cases.

11. The audio echo canceller according to claim 4, wherein the canceller is a part of one of a mobile communication and a conferencing system in which an input of the second decimator is a second audio signal captured by a microphone at a far end site including far end sound, and echo added input signal is a first audio signal captured by a microphone at a near end site including at least one of near end sound, noise and the acoustic echo.

12. The audio echo canceller according to claim 11, wherein the control module detects at least one of a presence and a content of said first and second audio signal and to accordingly adjust said response.

13. The audio echo canceller according to claim 12, wherein the control module adjusts the response to a first positive non-zero value, less than or equal to one, if near end sound together with noise, or near end sound only is detected, and to a second zero value in all other cases.

14. The audio echo canceller according to claim 3, wherein the first and the second decimators both include a low pass filter and a down sampler, and the interpolator includes an up sampler and a low pass filter.

15. The audio echo canceller according to claim 14, wherein at least one of the low pass filters include an FIR filter.

16. The audio echo canceller according to claim 14, wherein the first and second analyze filters, the synthesize filter and at least one of the low pass filters are linear phase.

17. The audio echo canceller according to claim 16, wherein the first and the second filters are time variant amplifiers.

18. The audio echo canceller according to claim 1, wherein the first and the second filters are amplifiers.

19. The audio echo canceller according to claim 1, further comprising:
one or more delay units disposed before and/or after, or integrated in, the second filter, which accumulated correspond to a delay appearing from the first decimator to the interpolator.

20. The audio echo canceller according to claim 1, wherein the model of the acoustic echo includes an FIR filter and an associated filter update algorithm.

21. The audio echo canceller according to claim 1, wherein said model of the acoustic echo further includes a miscellaneous processing unit including at least one of a residual echo masker, a noise reduction algorithm and a comfort noise generator.

22. A method of canceling an audio echo, comprising the steps of:
a first decimating step of decimating an echo added input signal to produce an input sub-signal;
producing an echo estimate;
a first subtracting step of subtracting the echo estimate from the input sub-signal;
a filtering step of filtering the input sub-signal;
a second step of subtracting the filtered input sub-signal from a signal output by the first subtracting step so as to provide an output sub-signal;
a second step of filtering the echo added input signal;
interpolating the output sub-signal output from the second subtracting step so as to generate an interpolator output signal; and
adding the filtered echo added input signal to the interpolator output signal.

23. The method according to claim 22, further comprising the steps of:
a first step of dividing an output of said first decimating step into a number of input sub-signals of respective sub frequency bands; and
combining a number of output sub-signals to an input of said interpolating step.

24. The method according to claim 23, further comprising the step of:
a second step of dividing an output of a second decimating step into said number of input signals of respective sub frequency bands, one of which is an input to the step of producing the echo estimate.

25. The method according to claim 24, further comprising the step of:
adjusting a response of said first and second dividing steps based on the input sub-signal and a corresponding echo model input signal.

26. The method according to claim 24, wherein the first and the second decimating steps use a low pass filter and a down sampler, and the interpolating step uses an up sampler and a low pass filter.

27. The method according to claim 26, wherein at least one of the low pass filters includes an FIR filter.

28. The method according to claim 26, wherein the first and second dividing steps, the combining step and at least one of the low pass filters are linear phase.

29. The method according to claim 28, wherein the first and the second filtering steps use time variant amplifiers.

30. The method according to claim 22, wherein the first and the second filtering steps are amplifiers.

31. The method according to claim 22, wherein the step of producing the echo estimate uses a FIR filter and an associated filter update algorithm.

* * * * *